(12) United States Patent
Natanzon

(10) Patent No.: US 12,634,143 B2
(45) Date of Patent: May 19, 2026

(54) METHODS AND SYSTEM OF PREVENTING DUPLICATION OF ENCRYPTED DATA

(71) Applicant: HUAWEI TECHNOLOGIES CO., LTD., Shenzhen (CN)

(72) Inventor: Assaf Natanzon, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 18/335,814

(22) Filed: Jun. 15, 2023

(65) Prior Publication Data

US 2023/0344640 A1      Oct. 26, 2023

Related U.S. Application Data

(63) Continuation of application No. PCT/EP2020/086494, filed on Dec. 16, 2020.

(51) Int. Cl.
*H04L 9/32* (2006.01)
*G06F 11/1446* (2026.01)
(Continued)

(52) U.S. Cl.
CPC ........ *H04L 9/3236* (2013.01); *G06F 11/1453* (2013.01); *H04L 9/0825* (2013.01); *H04L 9/50* (2022.05)

(58) Field of Classification Search
CPC ....... H04L 9/3236; H04L 9/0825; H04L 9/50; H04L 63/0428; H04L 63/123;
(Continued)

(56) References Cited

U.S. PATENT DOCUMENTS 8,930,686 B2 *   1/2015   Augenstein ........... G06F 21/602
                                                          713/150
10,223,544 B1 *   3/2019   Pogde ................... H04L 9/0891
                   (Continued)

FOREIGN PATENT DOCUMENTS

CN          109829326 A       5/2019

OTHER PUBLICATIONS

Sharma et al., "Blockchain Technology for Cloud Storage: A Systemic Literature Review," ACM Computing Surveys, Total 33 pages (Aug. 2020).

(Continued)

*Primary Examiner* — Lynn D Feild
*Assistant Examiner* — Vladimir I Gavrilenko
(74) *Attorney, Agent, or Firm* — Leydig, Voit & Mayer, Ltd.

(57) ABSTRACT

A method of preventing duplication of encrypted data in storage arranged in network in which two or more hosts can store data. The storage includes one or more encrypted data blocks, and the network further includes a distributed ledger accessible to each of the two or more hosts. The method leverages the distributed ledger for efficient deduplication of the data even with untrusted parties, such as the hosts. The method, performed by first host, includes obtaining a first hash value, a proof of ownership, and a random key for each block in plurality of new blocks of data. The method further includes generating and storing backup set description record, storing indication of the backup set description record, and determining zero or more blocks in plurality of new blocks that are present in storage to prevent duplication.

20 Claims, 7 Drawing Sheets

(51) Int. Cl.

| | | |
|---|---|---|
| *H04L 9/00* | (2022.01) | |
| *H04L 9/08* | (2006.01) | |

(58) Field of Classification Search
CPC ......... G06F 11/1453; G06F 2221/2107; G06F 21/6218; G06F 21/64
See application file for complete search history.

(56) References Cited

U.S. PATENT DOCUMENTS

| | | | |
|---|---|---|---|
| 10,534,919 B1 | 1/2020 | Panchbudhe et al. | |
| 11,032,259 B1 * | 6/2021 | Bernat | H04L 9/0822 |
| 11,128,448 B1 * | 9/2021 | Bernat | G06F 21/40 |
| 11,308,448 B1 * | 4/2022 | Knas | G06Q 10/105 |
| 11,573,929 B2 * | 2/2023 | Biondo Junior | H04L 9/0643 |
| 2014/0075193 A1 * | 3/2014 | Wang | H04L 9/0897 713/171 |
| 2014/0189348 A1 * | 7/2014 | El-Shimi | H04L 63/0428 713/165 |
| 2018/0300493 A1 * | 10/2018 | Li | G06F 21/64 |
| 2021/0191880 A1 * | 6/2021 | Ki | G06F 12/1408 |
| 2021/0216646 A1 * | 7/2021 | Miller | G06F 21/604 |
| 2023/0048167 A1 * | 2/2023 | Gai | G06F 21/16 |
| 2023/0206199 A1 * | 6/2023 | Chua | H04L 9/3239 705/64 |

OTHER PUBLICATIONS

Aparna et al., "Secure Deduplication for Images using Blockchain," 2020 IEEE International Conference on Electronics, Computing and Communication Technologies (CONECCT), Bangalore, India, Total 6 pages, Institute of Electrical and Electronics Engineers, New York, New York (Nov. 1, 2020).

Zheng et al., "A cloud data deduplication scheme based on certificate-less proxy re-encryption," Journal of Systems Architecture, SYSARC 101666, Total 44 pages (Oct. 2019).

* cited by examiner

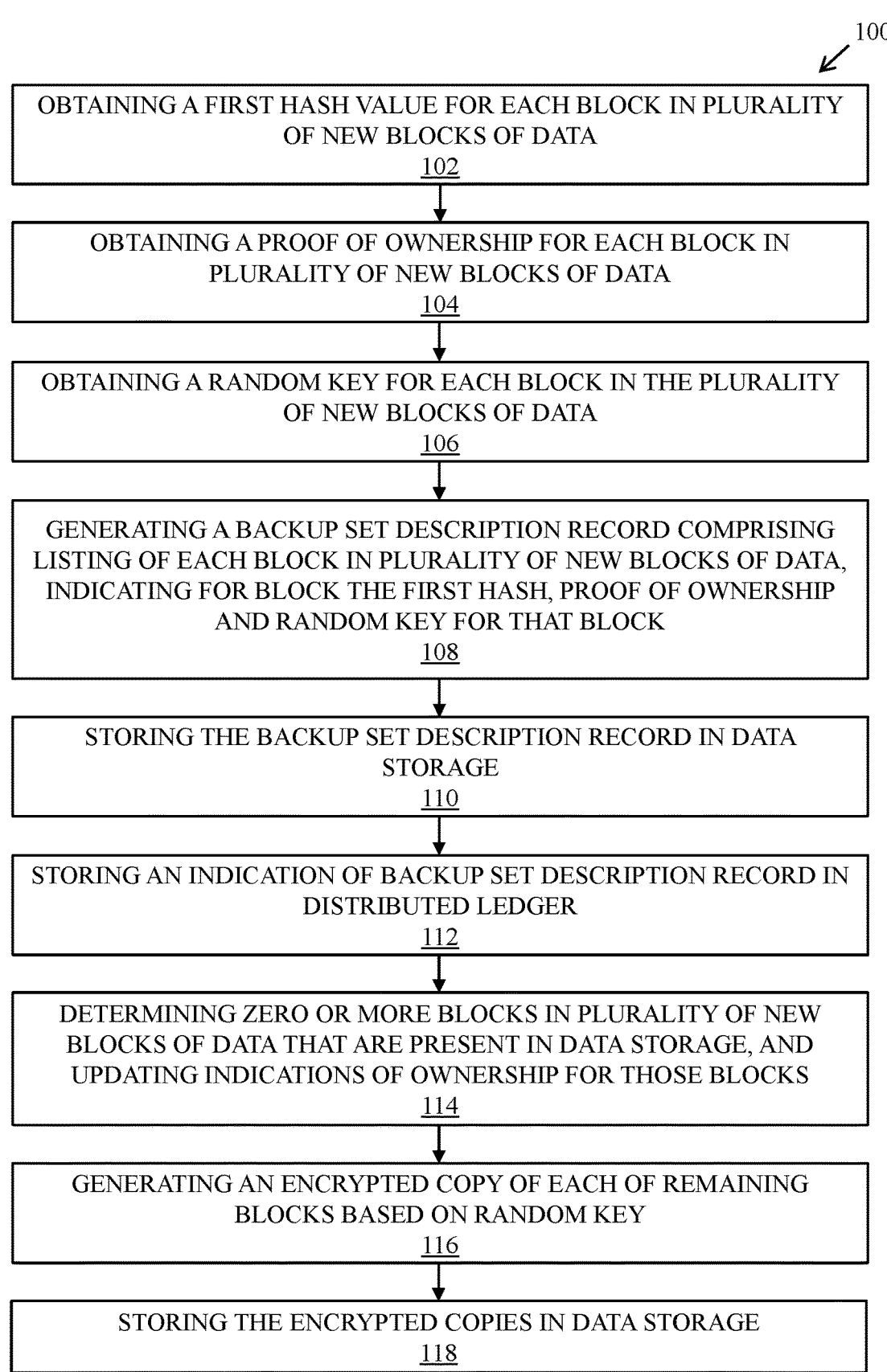

100

OBTAINING A FIRST HASH VALUE FOR EACH BLOCK IN PLURALITY
OF NEW BLOCKS OF DATA
102

OBTAINING A PROOF OF OWNERSHIP FOR EACH BLOCK IN
PLURALITY OF NEW BLOCKS OF DATA
104

OBTAINING A RANDOM KEY FOR EACH BLOCK IN THE PLURALITY
OF NEW BLOCKS OF DATA
106

GENERATING A BACKUP SET DESCRIPTION RECORD COMPRISING
LISTING OF EACH BLOCK IN PLURALITY OF NEW BLOCKS OF DATA,
INDICATING FOR BLOCK THE FIRST HASH, PROOF OF OWNERSHIP
AND RANDOM KEY FOR THAT BLOCK
108

STORING THE BACKUP SET DESCRIPTION RECORD IN DATA
STORAGE
110

STORING AN INDICATION OF BACKUP SET DESCRIPTION RECORD IN
DISTRIBUTED LEDGER
112

DETERMINING ZERO OR MORE BLOCKS IN PLURALITY OF NEW
BLOCKS OF DATA THAT ARE PRESENT IN DATA STORAGE, AND
UPDATING INDICATIONS OF OWNERSHIP FOR THOSE BLOCKS
114

GENERATING AN ENCRYPTED COPY OF EACH OF REMAINING
BLOCKS BASED ON RANDOM KEY
116

STORING THE ENCRYPTED COPIES IN DATA STORAGE
118

RECEIVING A REQUEST OF OWNERSHIP 202

EVALUATING THE PROOF DATA
204

IF THE NEW AND PREVIOUS BLOCKS ARE FOUND TO BE IDENTICAL,
PROVIDING FROM THE STORAGE TO THE FIRST HOST A KEY
TRANSFER RECORD INCLUDING THE KEYS TO THE DATA BLOCKS
ENCRYPTED WITH THE PUBLIC KEY OF THE FIRST HOST
206

METHODS AND SYSTEM OF PREVENTING DUPLICATION OF ENCRYPTED DATA

CROSS-REFERENCE TO RELATED APPLICATIONS

This application is a continuation of International Application No. PCT/EP2020/086494, filed on Dec. 16, 2020, the disclosure of which is hereby incorporated by reference in its entirety.

TECHNICAL FIELD

The present disclosure relates generally to the field of data protection and deduplication; and more specifically, to methods and systems of preventing duplication of encrypted data by leveraging a distributed ledger.

BACKGROUND

Data backup is used to protect and recover data in an event of data loss in a primary storage system. Examples of the event of data loss may include, but is not limited to, data corruption, hardware or software failure in the primary storage system, accidental deletion of data, hacking, or malicious attack. Thus, for safety reasons, a separate backup system or a storage system is used to store a backup of the data present in the primary storage system. Currently, conventional backup systems usually either read data changes or acquire data directly from the storage systems where data is stored. Some conventional backup systems store the entire changed data. As a result, with time, storage space of the backup systems becomes occupied as the changed data occupy a large storage space in the conventional backup systems. This is undesirable as it causes reduction in performance of the backup systems. Moreover, the cost of data storage, with all the associated costs including cost of storage hardware, continues to be a burden.

Currently, there are many techniques that may be employed for data reduction, for example data deduplication. However, such conventional techniques are inefficient and usually involve reducing the amount of data to be stored by eliminating duplicate data. For example, the data deduplication technique stores the data in the form of chunks and upon receiving new data, the new data is also divided into chunks of variable or fixed size. Thereafter, new data associated with the chunks of the new data is checked (i.e. if identical data is already written into the storage system or not). If, the new data is already written only a reference to the data is used. In this way, the data deduplication techniques overcome duplicating same data in the storage system. However, if the new data is stored using encryption, the data deduplication is possible only if there is mutual trust between a primary storage system and a backup system. In a case where there is no mutual trust between systems (computing devices) associated with a cryptographic data storage system or network, deduplication techniques may not enable data reduction as encrypted data is treated as new data (or changed data), resulting in inefficient data storage.

Therefore, in light of the foregoing discussion, there exists a need to overcome the aforementioned drawbacks associated with conventional cryptographic data storage system.

SUMMARY

The present disclosure seeks to provide methods, a system, and devices (e.g. a first host and second host in the system) for preventing duplication of encrypted data in a storage arranged in a network. The present disclosure seeks to provide a solution to the existing problem of inefficient data storage, that is how to further reduce data in a backup system as compared to conventional methods and systems. An aim of the present disclosure is to provide a solution that overcomes at least partially the problems encountered in prior art, and provide improved methods and system that provides an efficient data storage (i.e. an efficient data backup and restore).

The object of the present disclosure is achieved by the solutions provided in the enclosed independent claims. Advantageous implementations of the present disclosure are further defined in the dependent claims.

In one aspect, the present disclosure provides a method of preventing duplication of encrypted data in a storage arranged in a network in which two or more hosts can store data in the network, the storage comprising one or more encrypted data blocks, the network further comprising a distributed ledger, accessible to each of the two or more hosts and holding, for each of the one or more encrypted data blocks, a first hash value identifying the data block and one or more indications of ownership for the data block, wherein the method is to be performed by a first host of the two or more hosts when the first host stores a plurality of new blocks of data in the storage, the method comprising: obtaining a first hash value for each block in the plurality of new blocks of data; obtaining a proof of ownership for each block in the plurality of new blocks of data; obtaining a random key for each block in the plurality of new blocks of data; generating a backup set description record comprising a listing of each block in the plurality of new blocks of data, indicating for each block the first hash, the proof of ownership and the random key for that block; storing the backup set description record in the storage; storing an indication of the backup set description record in the distributed ledger; determining zero or more blocks in the plurality of new blocks of data that are present in the storage, and updating the indications of ownership for those blocks; generating an encrypted copy of each of the remaining blocks based on the random key; and storing the encrypted copies in the storage.

The present disclosure provides an improved method for deduplication of data that is stored in the storage that is common to two or more hosts which may not trust each other, for example in a cryptographic data storage system. In the present disclosure, the blocks of data are stored in an encrypted form in the storage and the backup set description record is used for identifying each block of data. As a result, when new blocks of data are to be stored by the first host, the backup set description record of new blocks of data is compared with the backup set description record of blocks of data already stored in the storage. For the new blocks of data which have identical or similar backup set description record, the new data block is not stored and the ownership of already stored data block (similar to new block of data) is updated to the first host. For the other new blocks of data, the new blocks of data are encrypted and stored. Thus, new blocks of data are identified if already existing in the storage before being stored in a storage which is common to two or more hosts which may not trust each other. Thus, the method of the present disclosure executes efficient data deduplication.

In an implementation form, the method further comprises obtaining a second hash value for each block in the plurality of new blocks of data as the proof of ownership.

The second hash value is stored in encrypted form and is used upon confirmation that the first hash values of the new block of data and previously stored blocks of data are identical. As a result, duplicate data is prevented to be stored between hosts which do not trust each other.

In a further implementation form, the method further comprises encrypting the proof of ownership and the random key for each block in the plurality of new blocks of data and indicating the encryptions of the proof of ownership and the random key in the backup set description record.

The encryption of the proof of ownership and the random key enables the distributed ledger to securely maintain record of the ownership of the block with the host.

In a further implementation form, the method further comprises determining zero or more of the blocks in the plurality of new blocks of data that are present in the storage, and updating the indications of ownership for those blocks by: querying the storage for one or more second backup set description records; retrieving the one or more second backup set description records; determining if there is a first hash in any of the second backup set description records, which first hash matches a first hash in the backup set description record; and updating the indications of ownership for each block having a matching hash to indicate the first host as an owner.

The zero or more of the blocks are identified to prevent storing of duplicate blocks in the storage as a result of which storage is efficient by the method of the present disclosure.

In a further implementation form, the querying the storage for one or more second backup set description records further comprises causing a similarity finding search to be performed by the storage.

The search to find similar backup set description records enables to prevent storing of duplicate blocks in the storage.

In a further implementation form, the method further comprises updating the indications of ownership for each block having a matching hash by: retrieving a public key of a current host owner from the indications of ownership; generating the proof of ownership based on the public key of the current host owner; storing a request of ownership in the distributed ledger, wherein data associated with the request of ownership including all blocks having a matching hash and the first hash and the proof of ownership of each block having a matching hash is stored in the storage.

By virtue of updating the indication of ownership for each block, the ownership of each block (i.e. a set of blocks or chunks for which the data itself is written to the storage (e.g. cloud storage) and just an indicator is placed in the distributed ledger for the request of ownership) having matching hash is provided to the first host from the current host. Thus, deduplication is implemented by preventing storage of zero or more blocks in the plurality of new blocks of data that are present in the storage.

In a further implementation form, the method further comprises storing the indication of the backup set description record in the distributed ledger along with a hash for the backup set description record.

By virtue of storing the indication of the backup set description record in the distributed ledger, the identification of duplicate blocks of data is efficiently implemented by the method.

In another aspect, the present disclosure provides a method of preventing duplication of data in a storage, arranged in a network in which two or more hosts can store data in the network, the storage comprising one or more encrypted data blocks, the network further comprising a distributed ledger, accessible to each of the two or more hosts and holding, for each of the one or more encrypted data blocks, a hash identifying the data block, the method is to be performed by a second host of the two or more hosts when a first host initiates storing a plurality of new blocks of data in the storage, the new blocks being identical to previous blocks of data stored in the storage by the second host, the method comprising: receiving from the distributed ledger a request of ownership stored in the distributed ledger by the first host, wherein data associated with said request of ownership is stored in the storage and comprises proof data that the new blocks of data is identical to the previous blocks of data, evaluating the proof data, and if the new and previous blocks are found to be identical, providing from the storage to the first host a key transfer record including the keys to the data blocks encrypted with the public key of the first host.

The present disclosure provides an improved method for deduplication of data that is stored in the storage that is common to two or more hosts which may not trust each other. In the present disclosure, when new blocks of data is to be stored by the first host, the backup set description record of the new blocks of data is compared with the backup set description record of data blocks already stored in the storage. The method evaluates that the new blocks of data is identical or similar to the previously stored blocks of data. If the backup set description record is identical or at least similar, the new blocks of data is not stored and the ownership of already stored data blocks (similar to new blocks of data) is given to the first host. Thus, new blocks of data is identified if already existing in the storage before being stored in a storage which is common to two or more hosts which may not trust each other. Moreover, it is to be noted that any proof request and key transfer notifications are indicated in the distributed ledger whereas the actual data, such as the proof data as well as the key transfer data (i.e. the key transfer record) is stored in the storage.

In an implementation form, the request of ownership comprises a first hash value and a proof of ownership value calculated by the first host based on the new block, the first hash value being unencrypted, and the proof of ownership value being encrypted with the public key of the second host.

By virtue of the first hash value and the proof of ownership value in the request of ownership, the second host evaluates the request of ownership and provides ownership to the first host. Thus, deduplication is implemented by preventing storage of zero or more blocks in the plurality of new blocks of data that are present in the storage.

In a further implementation form, the step of evaluating the proof comprises comparing the proof of ownership value to a proof of ownership value calculated by the second host, and determining that the new and previous blocks are identical if the proof of ownership values are identical.

By virtue of comparing the proof of ownership value to the proof of ownership value calculated by the second host, the second host provides the ownership of the block to the first host.

In a further implementation form, the distributed ledger is a blockchain.

The blockchain enables to keep an immutable record of the blocks of data that are stored in the storage. As a result, duplicate blocks of data are prevented from being stored in the storage common to hosts which do not trust each other, thereby improving deduplication.

In a further implementation form, the blockchain is a hyperledger.

The hyperledger maintains an immutable record of the blocks of data that are stored in the storage. As a result, duplicate blocks of data are prevented from being stored in the storage, thereby reducing data in the storage.

In another aspect, the present disclosure provides a computer program product comprising computer-readable code means which, when run in a processor of a host in a computer network comprising a storage holding encrypted data, said storage being accessible by the host and one or more other hosts will cause the host to perform the method of previous aspect.

The present disclosure provides an improved computer program product, executed at first host, for deduplication of data that is stored in the storage that is common to two or more hosts which may not trust each other. Beneficially, new block of data is identified if already existing in the storage, before being stored in a storage which is common to two or more hosts which may not trust each other.

In another aspect, the present disclosure provides a computer program product comprising computer-readable code means which, when run in a processor of a host in a computer network comprising a storage holding encrypted data, said storage being accessible by the host and one or more other hosts will cause the host to perform the method of previous aspect.

The present disclosure provides an improved computer program product, executed at second host, for deduplication of data that is stored in the storage that is common to two or more hosts which may not trust each other. Beneficially, new data block is identified if already existing in the storage before being stored in a storage which is common to two or more hosts which may not trust each other.

In an implementation form, a non-transitory storage means having thereon the computer-readable code means.

By virtue of the non-transitory storage means having computer-readable code means, an improved computer program product is provided which enables deduplication of data that is stored in the storage that is common to two or more hosts which may not trust each other.

In another aspect, the present disclosure provides a first host for use in a data network comprising a storage holding encrypted data, said storage being accessible by the host and one or more other hosts, the first host comprising a program memory and a processor for executing a program found in the program memory, wherein the program memory comprises a computer program product.

The present disclosure enables the first host to store data in the storage in a way that deduplicate data that may be stored by the first host in the storage is identified, even when two or more hosts (such as the first host, a second host, a third host and so on) which may not trust each other access the same storage.

In another aspect, the present disclosure provides a second host for use in a data network comprising a storage holding encrypted data, said storage being accessible by the host and one or more other hosts, the host comprising a program memory and a processor for executing a program found in the program memory, wherein the program memory comprises a computer program product of previous aspect.

The present disclosure enables the second host to execute deduplication of data that may be stored by a first host in the storage, even when two or more hosts (such as the first host, the second host, a third host and so on) do not trust each other.

In an implementation form, a computer system comprising a storage holding encrypted data and at least a first and a second host, said storage being accessible by the first host and the second host, wherein the first host is a first host of previous aspect and the second host is a second host of previous aspect.

The present disclosure provides an improved computer system for deduplication of data that is stored in the storage that is common to two or more hosts (such as the first host and the second host) which may not trust each other.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 1 is a flowchart of a method of preventing duplication of encrypted data in a storage by a first host arranged in a network, in accordance with an embodiment of the present disclosure;

Figure 2:
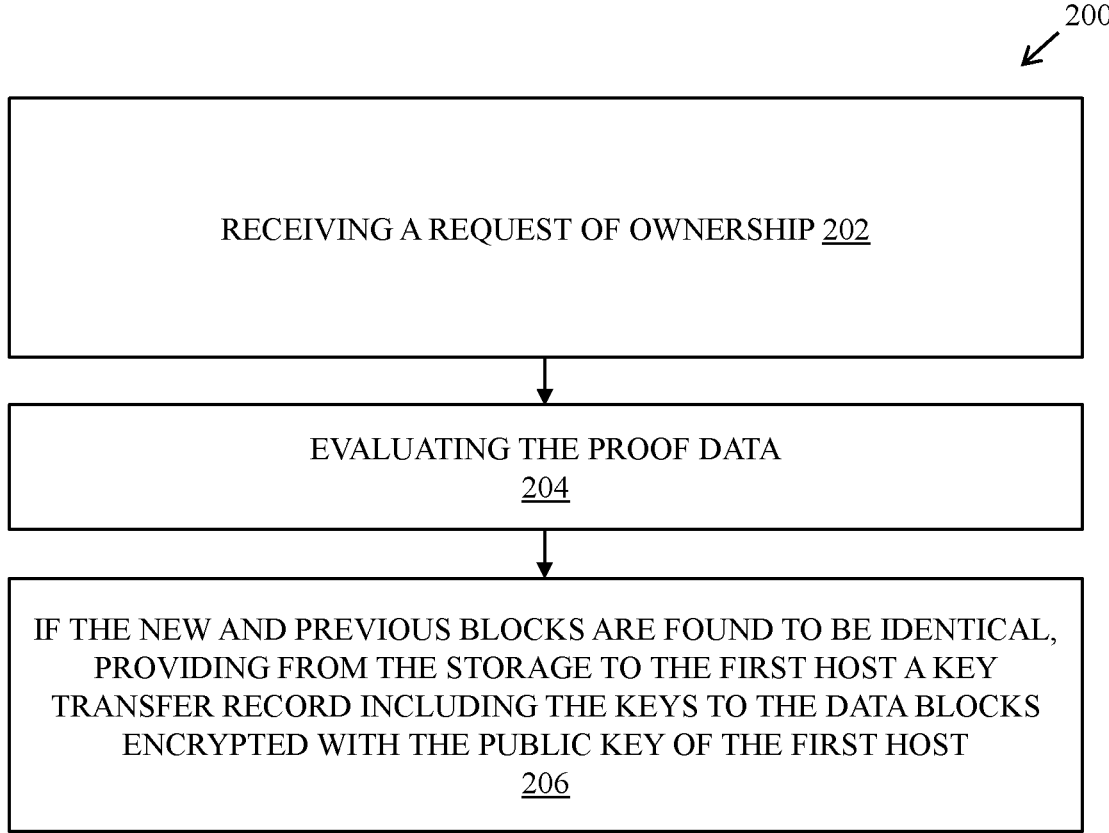
FIG. 2 is a flowchart of a method of preventing duplication of encrypted data in a storage by a second host arranged in a network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

FIG. 1 is a flowchart of a method of preventing duplication of encrypted data in a storage by a first host arranged in a network in which two or more hosts can store data in network, in accordance with an embodiment of the present disclosure. With reference to FIG. 1 there is shown a method 100. The method 100 includes the steps 102 to 118, performed by the first host of the two or more hosts, when the first host stores a plurality of new blocks of data in the storage. The method 100 is executed at the first host, shown and explained in greater detail, for example, in FIG. 3B.

In one aspect, the present disclosure provides a method 100 of preventing duplication of encrypted data in a storage arranged in a network in which two or more hosts can store data in the network, the storage comprising one or more encrypted data blocks, the network further comprising a distributed ledger, accessible to each of the two or more hosts and holding, for each of the one or more encrypted data blocks, a first hash value identifying the data block and one or more indications of ownership for the data block, wherein the method 100 is to be performed by a first host of the two or more hosts when the first host initiates storing a plurality of new blocks of data in the storage, the method 100 comprising: obtaining a first hash value for each block in the plurality of new blocks of data; obtaining a proof of ownership for each block in the plurality of new blocks of data; obtaining a random key for each block in the plurality of new blocks of data; generating a backup set description record comprising a listing of each block in the plurality of new blocks of data, indicating for each block the first hash, the proof of ownership and the random key for that block e.g. the proof of ownership and the random key are stored encrypted); storing the backup set description record in the storage; storing an indication of the backup set description record in the distributed ledger; determining zero or more blocks in the plurality of new blocks of data that are present in the storage, and updating the indications of ownership for those blocks; generating an encrypted copy of each of the remaining blocks based on the random key; and storing the encrypted copies in the storage.

The method 100 prevents duplication of the encrypted data in the storage. Duplication of the encrypted data refers to storing of a particular data (for example an original/same data) more than once in the storage. Duplication results in unnecessary occupation of storage space by duplicate copy(s) of the same data. Moreover, it causes reduction in performance of the storage. Moreover, the cost of data storage, with all the associated costs including cost of storage hardware, continues to increase with duplicate copies of original data. The method 100 of the present disclosure reduces the amount of data to be stored in the storage (e.g. a centralized cloud storage) that would otherwise have been stored in the storage by preventing duplication of even the obfuscated (e.g. encrypted) data. Obfuscated (or encrypted) data refers to the data that is stored in the storage not in actual form (i.e. plain language) but in an obfuscated (or encrypted) form and thereby making the accessibility of data using only specific keys (e.g. encryption keys) by which data is encrypted. In an example, the data (e.g. data associated with virtual machine, or any user data) may be encrypted using encryption algorithms. The data stored in the network may be referred to as any information stored as text documents, pictures, videos and the like which needs secure storage, preventing access by any unauthorized users. In other words, the method 100 prevents duplication of the encrypted data for a cryptographic data storage system.

The method 100 further relates to the storage arranged in a network in which two or more hosts can store data in the network, the storage comprising one or more encrypted data blocks, the network further comprising a distributed ledger, accessible to each of the two or more hosts and holding, for each of the one or more encrypted data blocks, a first hash value identifying the data block and one or more indications of ownership for the data block. The storage refers to a data storage or preferably a centralized cloud storage. The storage is configured to reliably store the data in form of one or more encrypted data blocks provided by the two or more hosts. The storage may also be referred to as the cloud storage. In this case, the storage is not trusted by the two or more hosts i.e. the two or more hosts trust that the storage can reliably store the data and may not lose the data, but the data may be leaked (i.e. accessed by unauthorized users). Network herein refers to a medium that allows a group of hosts (e.g. two or more hosts) to communicate with each other, share, and store data in a common storage (e.g. the centralised cloud storage). The host (may also referred to as a computing device or a host device) includes suitable logic, circuitry, interfaces, and/or code that is configured to store, process and/or share data with one or more hosts via the network. The host is described in detail later in the description. The distributed ledger is a database that is shared and synchronized with multiple parties (such as the first host, the second host and the like) to store records of the one or more encrypted data blocks. The distributed ledger may simply be referred to as a ledger that is distributed with multiple entities or devices in the network.

Each of the one or more encrypted data blocks stored in the storage includes the first hash value identifying the data block and one or more indications of ownership for the data block. The hash value has a defined length even if data is of an arbitrary size, and is generated using hash functions or hashing algorithms. In other words, hash values refer to fixed sized values that represents original data having arbitrary sizes. Examples of hashing algorithm include but are not limited to SHA-2 and MD5. Beneficially, hash values enable comparison between two blocks of data without actual comparing between data of the two blocks. The first hash value refers to the hash value generated for the data block for the first time by a particular host in the network. The first hash value enables in identification and prevention of storage of duplicate data blocks by hosts. The one or more indications of ownership may refer to indication of the owner (i.e. a given host of the two or more hosts) of the encrypted data block stored in the storage. In an example, the indications of ownership may include an identity (ID) of the host. The ownership is usually a second hash value created by different hash algorithm parameters, which is calculated if there is a need to have access to the full data.

According to an embodiment, the distributed ledger is a blockchain. The blockchain is an open, distributed ledger that can record transactions (i.e. changes) between two hosts efficiently and in a verifiable and permanent way. In an example, the blockchain enables in maintaining an immutable record of the blocks of data stored by the hosts. The distributed ledger prevents storage of duplicate blocks of data and thus deduplication can be efficiently implemented by the method of the present disclosure. The blockchain is a ledger, which is immutable and can be used with untrusted hosts wherein one host may not trust another host in the network. For use as a distributed ledger, the blockchain is typically managed by a peer-to-peer network collectively adhering to a protocol for inter-node communication and validating new data blocks of data. Although, blockchain records are not unalterable, the blockchain may be considered secure by design and exemplify a distributed computing system with high Byzantine fault tolerance. Decentralized consensus is therefore achieved with a blockchain.

According to an embodiment, the blockchain is a hyperledger. In an example, blockchain or any distributed ledger such as hyperledger may be used for maintaining meta data of the encrypted data stored in the storage. The hyperledger maintains an immutable record of the blocks of data that are stored in the storage. As a result, duplicate blocks of data are prevented from being stored in the storage, thereby reducing data in the storage.

According to an embodiment, the method 100 comprises the step of obtaining a plurality of new blocks of data by dividing data into two or more blocks (or chunks) of variable size (or length). The data may be user data (e.g. data of a virtual machine that is to be backed up in the storage) or other application data that the first host wishes to back up in the storage (i.e. the centralized cloud storage). The first host is configured to split the data (that is meant to be stored or to be backed up in the storage) into variable size pieces i.e. data blocks (or chunks) using a data chunking algorithm. Based on the data chunking algorithm the data is formed into the data blocks by the first host. Thus, the plurality of new blocks of data are generated by the first host.

Generally, it is comparatively easier to perform deduplication when some storage systems allow trust between the storage and clients letting the storage get the encryption keys of the clients and thus the storage can decrypt the data and compress and dedup it and then read and re-encrypt the data. Existing solution for deduplication requires trust between parties doing the deduplication, and thus do not allow deduplication between edge clients that do not trust each other. In contradiction to conventional systems and methods, the method 100 of the present disclosure leverages a distributed ledger for efficient deduplication of the data even with untrusted parties (i.e. can perform deduplication between any combination of trusted and untrusted entities). In other words, the method 100 allows deduplication between edge clients that do not trust each other. Moreover, it is known that each transaction in the blockchain is very expensive (e.g. in terms of high computational processing power required in processing and validation of such transaction). The method 100 not only works for large data sizes (data above a threshold), but also can work with variable length deduplication for data blocks of small sizes (less than the threshold or even large sizes, i.e. large dedup data sets) in real life scenarios. The method 100 further provides a protocol to perform deduplication for batches of data sets. As a result, deduplication is more efficiently implemented by the method 100 of the present disclosure.

At step 102, the method 100 comprises obtaining a first hash value for each block in the plurality of new blocks of data. The first host is configured to obtain the first hash value by applying a hash function or hashing algorithm to each block of the new blocks of data. The first hash value enables in distinct identification of the new blocks of data in comparison to one or more encrypted data blocks already stored in the storage. In will be evident that, a identical hash value is generated for a given block of data irrespective of the host applying the hashing algorithm. The first hash value for each of the new blocks of data is made public and published by the first host. In other words, the first hash value may also be referred to as a public hash value.

At step 104, the method 100 comprises obtaining a proof of ownership for each block in the plurality of new blocks of data. The proof of ownership is obtained to enable the first host to have ownership of each of the new block of data that may be added to the distributed ledger. The proof of ownership may indicate that the new block of data, to be added in the blockchain, is create by the first host. The obtaining of the proof of ownership prevents addition of duplicate data blocks similar to the new block of data, by any other host of the network.

According to an embodiment, the method 100 further comprises obtaining a second hash value for each block in the plurality of new blocks of data as the proof of ownership. The second hash value is created by applying the hashing algorithms known in the art. The second hash value provides enhanced security to the new block of data whereas the first hash value enables identification of duplicate data block in the distributed ledger. The second hash value may be calculated using a specific host ID as well (together with the block data). The second hash value is not published and thereby also be referred to as a secret hash value or private hash value.

At step 106, the method 100 comprises obtaining a random key for each block in the plurality of new blocks of data. The random key is generated by the first host for each of the new blocks of data. In an example, the first host may employ a random key generation algorithm for generating the random key for each of the new blocks of data. The random key is used for encrypting of the block data to enable access of block data only by the first host. The random key may be different for each of the new blocks of data.

The random key may be any key which is used to encrypt a specific payload (i.e. each block). The random key and the second hash value or proof of ownership may be encrypted with a given key known just to the first host that generates the random key (e.g. it can be the public key of the first host, or any other key and that the second hash or proof are encrypted with key known only to first host. It is to be noted that only the host (i.e. the first host in this case) creating the random key and the second hash value (i.e. the proof of ownership) can read them.

At step 108, the method 100 comprises generating a backup set description record comprising a listing of each block in the plurality of new blocks of data, indicating for each block the first hash, the proof of ownership, and the random key for that block. The backup set description record may also be referred to as backup set description file or simply backup description file. The backup set description record includes the listing of each block of the plurality of new blocks, which enables in easy identification of each new block that the first host has ownership. The backup set description record includes three fields for each block in the listing, where the three fields are the first hash value, the proof of ownership and the random key. In an example, listing of each block of data may also refer to associating each new block with a distinct name or identifier to enable identification of each new block. In another example, listing of each block of data may also refer to listing of storage address of each new block.

According to an embodiment, the method 100 further comprises encrypting the proof of ownership and the random key for each block in the plurality of new blocks of data and indicating the encryptions of the proof of ownership and the random key in the backup set description record. The proof of ownership including the second hash may be encrypted with the random key. The random key for each block of data may be encrypted with a private key of the first host, to enable the first host uploading the block of data to recover the random key from the data when stored in the storage, such as a cloud storage.

At step 110, the method 100 comprises storing the backup set description record in the storage. The backup set description record is uploaded in the storage (e.g. the centralized cloud storage) by the first host to enable in identifying if the new blocks of data are already present in the storage (i.e. checking if ownership of new blocks of data is already present in the storage. The storing of the backup set description record enables in efficient identification of duplicate blocks of data in comparison to conventional storages.

At step 112, the method 100 comprises storing an indication of the backup set description record in the distributed ledger. The first host is configured to publish in the distributed ledger the fact that the backup set description record is uploaded in the storage (i.e. the secondary data storage or a cloud storage). The indication may be referred to as a message that the first host provides to the distributed ledger.

According to an embodiment, the method 100 further comprises storing the indication of the backup set description record in the distributed ledger along with a hash for the backup set description record. The indication may include a hash of the content of this backup set description record in the message, as well as a number of hash digests that are published. The indication may further include a storage address of the backup set description record in the storage.

At step 114, the method 100 comprises determining zero or more blocks in the plurality of new blocks of data that are present in the storage, and updating the indications of ownership for those blocks. The determining of the zero or more blocks that are present in the storage enables in preventing the storage of such zero or more blocks which are duplicate. As a result of which deduplication of data is implemented by the method 100 of the present disclosure.

The zero or more blocks that are present in the storage is determined based on the backup set description record of the new blocks of data and the backup set description record of the blocks of data already stored in the storage. Further, the indications of ownership of blocks of data is updated such that ownership of the zero or more blocks in the plurality of new blocks of data that are present in the storage is not given to the first host.

According to an embodiment, the method 100 further comprises determining zero or more of the blocks in the plurality of new blocks of data that are present in the storage, and updating the indications of ownership for those blocks by: querying the storage for one or more second backup set description records; retrieving the one or more second backup set description records; determining if there is a first hash in any of the second backup set description records, which first hash matches a first hash in the backup set description record; and updating the indications of ownership for each block having a matching hash to indicate the first host as an owner. The first host provides a query to the storage to find the most similar backup set description records (i.e. the one or more second backup set description records) which are already stored, in comparison to the backup set description record provided by the first host. Further based on the query, the storage provides the most similar backup set description record to the first host. The first host retrieves by for example downloading each of such one or more second backup set description records from the storage. In an example, each of the second backup set description records include a respective first hash value and a respective proof of ownership which were stored in the storage by different hosts, such as a second host. Based on the one or more second backup set description records retrieved from the storage, the first host compares the first hash value of the one or more second backup set description records with the first hash value of backup set description record of the first host. The first hash values are compared to find the zero or more blocks in the plurality of new blocks of data that are present in the storage. Further, the first host provides requests for ownership of the zero or more blocks in the plurality of new blocks of data that are present in the storage and further updates the indications of ownership for each block having the matching hash to indicate the first host as an owner.

According to an embodiment, the querying the storage for one or more second backup set description records further comprises causing a similarity finding search to be performed by the storage. The storage (e.g. the cloud storage) is configured to create a search engine based on the backup set description records provided by the plurality of hosts in the network, such as the two or more hosts. The search engine enables finding of similar backup set description records. In an example, the storage provides an Application Programming Interface (API) to get the backup set description records which is most similar to the backup set description record provided by the first host. Further, based on the API, the storage provides a set of the most similar backup set description record i.e. records which share the most amount of identical public hash values. In an example, the similar records can be found using similarity hash techniques such as a minhash, i.e. for each backup set description record a set of similarity hashes are kept. The API may be as following:
getMostSimilarBackupDescriptionFiles(backupDescip-
tionFileID).

According to an embodiment, the method 100 further comprises updating the indications of ownership for each block (e.g. a set of blocks) having a matching hash by:

retrieving a public key of a current host owner from the indications of ownership; generating the proof of ownership based on the public key of the current host owner; storing a request of ownership in the distributed ledger, wherein data associated with the request of ownership including all blocks having a matching hash and the first hash and the proof of ownership of each block having a matching hash, is stored in the storage. In other words, a request is made for many identical blocks ownership together (i.e. for the set of blocks together) by sending a request file with all the proofs encrypted with the public key, to the storage (i.e. cloud storage), and placing indication of the request as well as a hash of the full request data in the distributed ledger. Alternatively stated, the request of ownership may include the request file with proofs of ownership of all blocks having matching hash, encrypted with the public key. The public key (i.e. first hash value) of the current host owner (such as second host) is retrieved from the indications of ownership stored by the current host in the distributed ledger. Further, the proof of ownership is generated by encrypting the second hash value along with the first host ID encrypted with the public key of the current host currently owning the one or more blocks. Further, the request of ownership is stored in the distributed ledger, by the first host, which includes initiating a 'RequestDataKey' process. The 'RequestDataKey' includes a file with all entries of the requests, where each entry includes: first hash value of the one or more blocks and proof of ownership. The first host publishes in the distributed ledger that the file of the request of ownership is published along with the hash values, and a number of hash requests.

According to an embodiment, based on the request from the first host, the current host such a second host (owning the one or more blocks) reads the file in the request of ownership, as well as the original backup set description records (such as a second backup set description records) that the current host had published. The second host verifies that all the requests made by the first host are correct, and thereby creates a file with the keys for each of the one or more blocks encrypted with a random key. This file is uploaded to the storage. Moreover, the current host publishes a 'TransferDataKeyMessage' message on the distributed ledger with the random key, encrypted by the public hash (i.e. first hash value) of the current host.

At step 116, the method 100 comprises generating an encrypted copy of each of the remaining blocks based on the random key. Each new block of data that is not found in the aforementioned step is compressed and encrypted with the random key of the first host. The new block of data is compressed to enable efficient utilization of storage space of the storage by the two or more hosts.

At step 118, the method 100 comprises storing the encrypted copies in the storage. The encrypted blocks of data are stored in the storage, as blocks with a KeyID which is equal to the first hash value (i.e. public hash value). Further, an indication of the host owning the data is stored, so that several host can store the same data piece. The new blocks of data that are already in the storage are not stored again. And thus, deduplication is implemented by the method 100 of the present disclosure.

According to an embodiment, the method 100 further comprises updating the backup set description record and publishing (i.e. placing) a message or an indication of updating the backup set description record in the distributed ledger.

The steps 102 to 118 are only illustrative and other alternatives can also be provided where one or more steps are added, one or more steps are removed, or one or more steps are provided in a different sequence without departing from the scope of the claims herein.

In one aspect, provided is a computer program product comprising a computer-readable code means which, when run in a processor of a host in a computer network comprising a storage holding encrypted data, said storage being accessible by the host and one or more other hosts will cause the host to perform the method 100. In an example, the computer-readable code is executed by the first host in the network, such as the cryptographic data storage network. Further, examples of a computer readable storage, of the computer program product, for providing a non-transient memory may include, but is not limited to, an electronic storage device, a magnetic storage device, an optical storage device, an electromagnetic storage device, a semiconductor storage device, or any suitable combination of the foregoing.

According to an embodiment, the computer program product comprises a non-transitory storage means having thereon the computer-readable code means to execute the operations of method 100. Examples of implementation of the non-transitory computer-readable storage means include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

FIG. 2 is a flowchart of a method of preventing duplication of encrypted data in a storage, performed by a second host, arranged in a network in which two or more hosts can store data in the network, in accordance with an embodiment of the present disclosure. With reference to FIG. 2 there is shown a method 200. The method 200 includes the steps 202 to 206, performed by the second host of the two or more hosts when a first host stores a plurality of new blocks of data in the storage, the new blocks being identical to previous blocks of data stored in the storage by the second host. The method 200 is executed at the second host, shown and explained in greater detail, for example, in FIG. 3C.

In another aspect, the present disclosure provides the method 200 of preventing duplication of data in a storage, arranged in a network in which two or more hosts can store data in the network, the storage comprising one or more encrypted data blocks, the network further comprising a distributed ledger, accessible to each of the two or more hosts and holding, for each of the one or more encrypted data blocks, a hash identifying the data block, the method 200 is to be performed by a second host of the two or more hosts when a first host stores a plurality of new blocks of data in the storage, the new blocks being identical to previous blocks of data stored in the storage by the second host, the method 200 comprising: receiving from the distributed ledger a request of ownership stored in the distributed ledger by the first host, wherein data associated with said request of ownership is stored in the storage and comprises proof data that the new blocks of data is identical to the previous blocks of data, evaluating the proof data, and if the new and previous blocks are found to be identical, providing from the storage to the first host a key transfer record including the keys to the data blocks encrypted with the public key of the first host.

At step 202, the method 200 comprises receiving, from the distributed ledger the request of ownership by the first host. The distributed ledger just includes an indicator for the request of ownership and the actual data related to the request of ownership including all blocks and the proof data of ownership of each block is stored in the storage. Moreover, it is to be noted that any proof request and key transfer notifications are also indicated in the distributed ledger whereas the actual data, such as the proof data as well as the key transfer data (i.e. the key transfer record) is stored in the storage. The proof that the new blocks of data are identical to the previous blocks of data. The first host is configured to provide the request of ownership to the distributed ledger upon determining that a first hash value of the new blocks of data is found in the distributed ledger by comparing the first hash value of the new blocks of data with first hash value of the previous blocks of data. The first host provides the request of ownership to get ownership of the previous blocks which is similar to the new blocks of data. The request of ownership relates to a communication (or transaction) between the first host and the second host regarding the request of the key for the previous block. The request of ownership is entered in the distributed ledger by the first host to receive from the second host, a proof of ownership (i.e. second hash value) which is generated by encrypting a second hash value along with the first host ID encrypted with a public key of the second host currently owning the previous blocks. The request of ownership and the data associated with the request of ownership enables the first host to enable validation that the new blocks of data are already present in the storage after determining that the first hash value of the new blocks of data is found in the distributed ledger. It is to be noted that the request of ownership of all blocks having matching hash is aggregated in one file in the storage (i.e. the cloud storage) and further the file is sent as a request to the distributed ledger to evaluate all the requests of ownership.

According to an embodiment, the request of ownership comprises a first hash value and a proof of ownership value calculated by the first host based on the new block, the first hash value being unencrypted, and the proof of ownership value being encrypted with the public key of the second host. The first hash value enables in distinctly identifying the new block in comparison to one or more encrypted blocks of data already stored in the storage. In an example, the first host receives the second host's public key from the distributed ledger upon determining that the first hash value of the new block of data is found in the distributed ledger. The first hash value and the second hash value enable to evaluate if the new block of data is similar to previous blocks of data already stored. The first hash value is obtained by the first host as described in the step 102 of FIG. 1. The first hash value and the second hash value enable in providing proof that the new block of data is identical to the previous block of data.

At step 204, the method 200 comprises evaluating the proof data which is stored in the storage. The second host is configured to receive the request of ownership and based on the request of ownership received, the second host evaluates the proof data to determine that the new blocks of data are identical to the previous blocks of data. The evaluation of the proof data is performed by comparison of the hash values.

According to an embodiment, the step of evaluating the proof data comprises comparing the proof of ownership value to a proof of ownership value calculated by the second host, and determining that the new and previous blocks are identical if the proof of ownership values are identical. The proof of ownership (i.e. second hash value) of the new block of data calculated by the first host is compared with the proof of ownership (i.e. second hash value) of previous block calculated by the second host. In an example, if the second hash values are identical than the new block of data of the first host is identical to the previous block of the second host. In another example, if the second hash values are not identical than the new block of data of the first host is not identical to the previous block of the second host.

At step 206, the method 200 comprises if the new and previous blocks are found to be identical, providing from the storage to the first host a key transfer record including the keys to the data blocks encrypted with the public key of the first host. The first host makes the request for the ownership of the previous block from the second host, therefore the second host accepts the request of the first host and shares the key of the previous block with the first host. Accordingly, the key transfer record, i.e. communication or transaction between the first and second hosts regarding key exchange, is maintained in the distributed ledger or blockchain. Typically, the second host adds the key transfer notification in the distributed ledger and the key transfer data (i.e. the key transfer record) into the storage after sharing the requested key for the previous block with the first host. The key transfer record includes the keys to the data encrypted with the public key of the first host because this allows only the first host to have access to the key using private key of the first host. Further, an indication is provided to the distributed ledger about the key transfer record. It is to be noted that all the keys are first aggregated in a file (e.g. the key transfer record) for a set of identical blocks, and just an indication is placed in the distributed ledger.

The steps 202 to 206 are only illustrative and other alternatives can also be provided where one or more steps are added, one or more steps are removed, or one or more steps are provided in a different sequence without departing from the scope of the claims herein.

In another aspect, the present disclosure provides a computer program product comprising computer-readable code means which, when run in a processor of a host in a computer network comprising a storage holding encrypted data, said storage being accessible by the host and one or more other hosts will cause the host to perform the method 200. In an example, the computer-readable code is executed by the second host in the network, such as the cryptographic storage network. According to an embodiment, the computer program product comprises a non-transitory storage means having thereon the computer-readable code means.

Figure 3A:
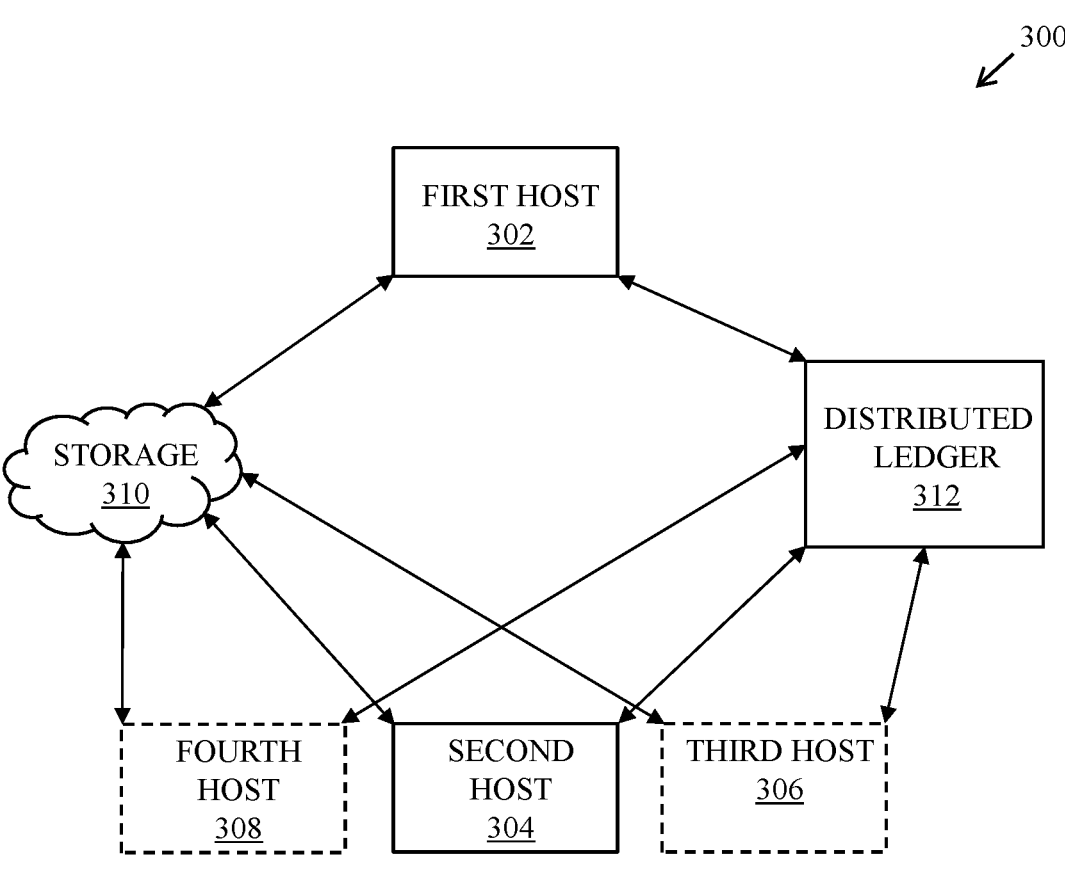
FIG. 3A is an illustration of a network environment diagram of a computer system of preventing duplication of encrypted data in a storage, in accordance with an embodiment of the present disclosure.

FIG. 3A is an illustration of a network environment diagram of a computer system of preventing duplication of encrypted data in a storage, in accordance with an embodiment of the present disclosure. With reference to FIG. 3A, there is shown a computer system 300. The computer system 300 includes a plurality of hosts, such as a first host 302, a second host 304, a third host 306 and a fourth host 308. The computer system 300 further includes a storage 310 and a distributed ledger 312. The first host 302, the second host 304, the third host 306 and the fourth host 308 can access and store encrypted data in the storage 310 and access the distributed ledger 312. In practice, there are thousands of hosts, which is omitted here for the sake of brevity.

In one aspect, the present disclosure provides a computer system 300 comprising a storage 310 holding encrypted data and at least a first and a second host 304, said storage 310 being accessible by the first host 302 and the second host 304.

The term host (may also referred to as host device) includes suitable logic, circuitry, interfaces, and/or code that is configured to store, process and/or share information with one or more hosts in the storage 310 via the distributed ledger 312. Examples of the host include, but is not limited to a host server, a host production environment system, a thin client connected to the host server, a primary storage system, and user devices (such as cellular phones, personal digital assistants (PDAs), handheld devices, laptop computers, personal computers, an Internet-of-Things (IoT) device, a smart phone, a machine type communication (MTC) device, a computing device, a drone, or any other portable or non-portable electronic device). In an example, the first host 302 of the present disclosure stores a new block of data in the storage 310 and the second host 304 enables in identification of whether new block of data is already present in the storage 310. In an example, the third host 306, the fourth host 308 and so on, may also enable in identification of whether new block of data is already present in the storage 310.

The computer system 300 provides the storage 310 holding encrypted data. The said storage 310 is accessible by the first host 302 and the second host 304. The term storage 310 as used herein refers to a volatile or persistent medium, such as an electrical circuit, magnetic disk, virtual memory or optical disk, in which a host can store data in form of encrypted data blocks for any duration. In other words, the storage 310 comprises one or more encrypted data blocks. In an example, the storage 310 is a centralized cloud storage.

According to an embodiment, the storage 310 is nonvolatile mass storage such as physical storage media. Furthermore, a single storage may encompass and in a scenario wherein computing system is distributed, a processing, memory and/or storage capability may be distributed as well. The storage 310 may be a cloud storage comprising one or more encrypted data blocks. In an example, the cloud storage is configured to store an object. In an example, the cloud storage includes an object storage that depicts a new block of data that the first host stores and an encrypted storage to store the blocks of data in an encrypted form. Beneficially, the cloud storage provides an improved storage for deduplication of data that is stored in the cloud storage that is common to the hosts.

The distributed ledger 312 is a database that is shared and synchronized by multiple parties (such as the first host 302, the second host 304 and the like). In other words, the distributed ledger 312 is accessible to each of the two or more hosts (such as the first host 302, the second host 304) and holding, for each of the one or more encrypted data blocks, a first hash value identifying the data block. The distributed ledger is used as a decentralized data base that allows other hosts to join and also allows verifying the data ownership, which can be later used for charging purposes and for compliance. The distributed ledger 312 enables transactions (i.e. changes) in the data stored in the distributed ledger 312 only by mutual consensus of all the parties preventing any changes being made by any unauthorized party or preventing any unauthorized changes made by any authorized party. All the information stored in the distributed ledger 312 is securely stored via cryptography such that information can be accessed only using authorized cryptographic keys available with authorized users only.

According to an embodiment, the distributed ledger 312 is a blockchain. The blockchain is accessible to each of the first host 302, the second host 304, and the third host 306, the fourth host 308. The blockchain holds for each of the one or more encrypted data blocks, a hash value identifying the data block. According to an embodiment, the blockchain is a hyperledger.

In operation, the computer system 300 (hereinafter, simply referred to as a system 300) is configured to execute the following steps performed by a first host 302 of the two or more hosts when the first host 302 stores a plurality of new blocks of data in the storage 310. The system 300 is configured to obtain a first hash value for each block in the plurality of new blocks of data, obtain a proof of ownership for each block in the plurality of new blocks of data and obtain a random key for each block in the plurality of new blocks of data. The system 300 is further configured to generate a backup set description record comprising a listing of each block in the plurality of new blocks of data, indicating for each block the first hash, the proof of ownership and the random key for that block. The system 300 is further configured to store the backup set description record in the storage 310, store an indication of the backup set description record in the distributed ledger 312. The system 300 is further configured to determine zero or more blocks in the plurality of new blocks of data that are present in the storage 310 and update the indications of ownership for those blocks. The system 300 is further configured to generate an encrypted copy of each of the remaining blocks based on the random key; and store the encrypted copies in the storage 310.

Figure 3B:
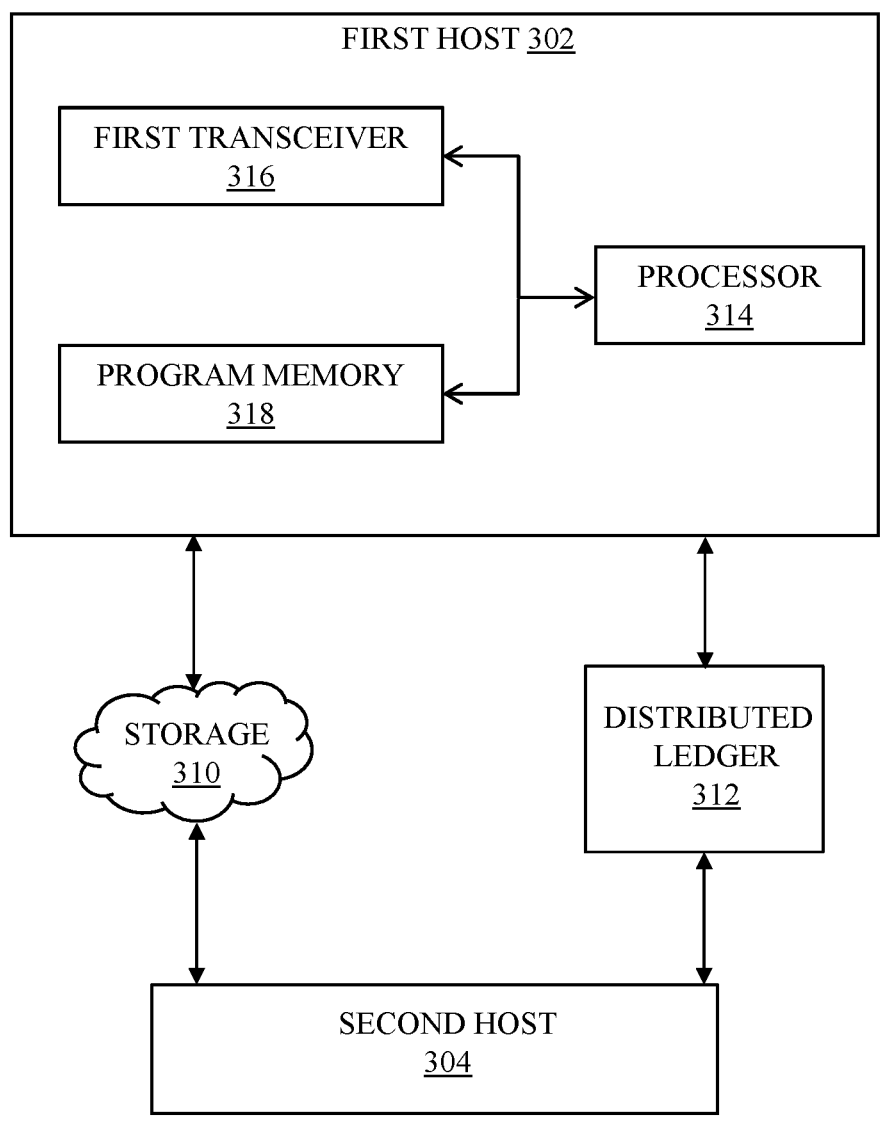
FIG. 3B is an illustration of a block diagram that illustrates various exemplary components of a first host for use in a data network, in accordance with an embodiment of the present disclosure.

FIG. 3B is an illustration of a block diagram that illustrates various exemplary components of a first host for use in a data network, in accordance with an embodiment of the present disclosure. FIG. 3B is described in conjunction with FIG. 3A. With reference to FIG. 3B, there is shown the first host 302. The first host 302 includes a processor 314, a first transceiver 316, and a program memory 318. The processor 314 may be communicatively coupled to the first transceiver 316 and the program memory 318. The first host 302 is connected to the second host 304 via the storage 310 and the distributed ledger 312.

There is shown, the first host 302 for use in a data network comprising a storage 310 holding encrypted data, said storage 310 being accessible by the first host 302 and one or more other hosts, the first host 302 comprising a program memory 318 and a processor 314 for executing a program found in the program memory 318, wherein the program memory comprises a computer program product.

The processor 314 of the first host 302 is configured to provide data in form of data blocks for storage in the storage 310. In an implementation, the processor 314 is configured to execute instructions stored in the program memory 318. In an example, the processor 314 may be a general-purpose processor. Other examples of the processor 314 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the processor 314 may refer to one or more individual processors, processing devices, a processing unit that is part of a machine, such as the first host 302.

The first transceiver 316 includes suitable logic, circuitry, and interfaces that may be configured to communicate with one or more external devices, such as the storage 310 and the distributed ledger 312. Examples of the first transceiver 316 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The program memory 318 refers to a primary storage system of the first host 302. The program memory 318 includes suitable logic, circuitry, and interfaces that may be configured to store instructions executable by the processor

314. Examples of implementation of the program memory 318 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory. The program memory 318 may store an operating system and/or other program products (including one or more operation algorithms) to operate the first host 302.

In one aspect, in operation, the processor 314 of the first host 302 stores a plurality of new blocks of data in the storage 310. The processor 314 is configured to obtain a first hash value for each block in the plurality of new blocks of data, obtain a proof of ownership for each block in the plurality of new blocks of data, obtain a random key for each block in the plurality of new blocks of data. The processor 314 is further configured to generate a backup set description record comprising a listing of each block in the plurality of new blocks of data, indicating for each block the first hash, the proof of ownership and the random key for that block. The processor 314 is further configured to store the backup set description record in the storage 310, store an indication of the backup set description record in the distributed ledger 312. The processor 314 is further configured to determine zero or more blocks in the plurality of new blocks of data that are present in the storage 310, and update the indications of ownership for those blocks. The processor 314 is further configured to generate an encrypted copy of each of the remaining blocks based on the random key; and store the encrypted copies in the storage 310.

According to an embodiment, the processor 314 is further configured to obtain a second hash value for each block in the plurality of new blocks of data as the proof of ownership. The second hash value is created by applying the hashing algorithms known in the art. The second hash value provides enhanced security to the new block of data.

According to an embodiment, the processor 314 is further configured to encrypt the proof of ownership and the random key for that block and indicate the encryptions of the proof of ownership and the random key in the backup set description record. The proof of ownership including the second hash may be encrypted with the random key. The random key for each block of data may be encrypted with a private key of the first host 302.

According to an embodiment, the processor 314 is further configured to determine zero or more of the blocks in the plurality of new blocks of data that are present in the storage 310, and update the indications of ownership for those blocks. The processor 314 is configured to execute a query on the storage 310 for one or more second backup set description records; retrieve the one or more second backup set description records; determine if there is a first hash in any of the second backup set description records, which first hash matches a first hash in the backup set description record; and update the indications of ownership for each block having a matching hash to indicate the first host 302 as an owner.

According to an embodiment, the processor 314 is further configured to execute the query on the storage 310 for one or more second backup set description records by execution of a similarity finding search to be performed by the storage 310. The storage 310 is configured to create a search engine based on the backup set description records provided by the plurality of hosts. The search engine enables finding of similar backup set description records.

According to an embodiment, the processor 314 is further configured to update the indications of ownership for a block having a matching hash. The processor 314 is configured to retrieve a public key of a current host owner from the indications of ownership, generate the proof of ownership based on the public key of the current host owner, store a request of ownership in the storage 310312, the request of ownership including one all blocks having a matching hash and the first hash and the proof of ownership of each block having a matching hash.

According to an embodiment, the processor 314 is further configured to store the indication of the backup set description record in the distributed ledger 312 along with a hash for the backup set description record. The indication may include a hash of the content of this backup set description record in the message, as well as a number of hash digests that are published.

Figure 3C:
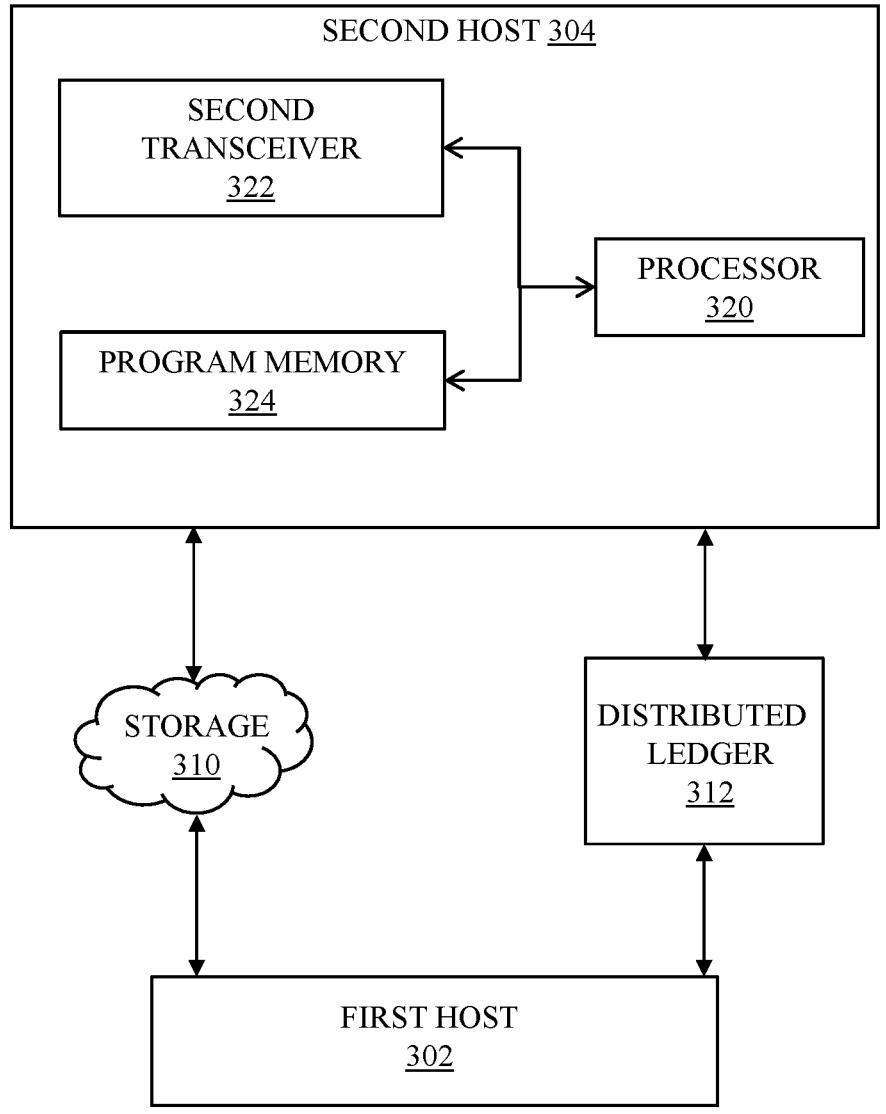
FIG. 3C is an illustration of a block diagram that illustrates various exemplary components of a second host, in accordance with an embodiment of the present disclosure.

FIG. 3C is an illustration of a block diagram that illustrates various exemplary components of a second host, in accordance with an embodiment of the present disclosure. FIG. 3C is described in conjunction with FIGS. 3A and 3B. With reference to FIG. 3C, there is shown the second host 304. The second host 304 includes a processor 320, a second transceiver 322, and a program memory 324. The processor 320 may be communicatively coupled to the second transceiver 322 and the program memory 324. The second host 304 is connected to the first host 302 via the storage 310 and the distributed ledger 312.

There is shown, a second host 304 for use in a data network comprising a storage holding encrypted data, said storage 310 being accessible by the second host 304 and one or more other hosts, the second host 304 comprising a program memory 324 and a processor 320 for executing a program found in the program memory 324, wherein the program memory 324 comprises a computer program product.

The processor 320 of the second host 304 is configured to execute instructions stored in the program memory 324 of the second host 304. Examples of the processor 320 of the second host 304 is similar to that of the processor 314 of the first host 302 (FIG. 3B). Similarly, examples of implementation of the second transceiver 322, and the program memory 324 is similar to that of the first transceiver 316, and the program memory 318, respectively of FIG. 3B.

In one aspect, in operation, the processor 320 is configured to execute the following steps when a first host stores a plurality of new blocks of data in the storage 310, the new blocks being identical to previous blocks of data stored in the storage 310 by the second host. The processor 320 is configured to receive from the distributed ledger 312 a request of ownership stored in the distributed ledger 312 by the first host 302, wherein data associated with said request of ownership is stored in storage 310 and comprises proof data that the new blocks of data is identical to the previous blocks of data. The processor 320 is further configured to evaluate the proof data, and if the new and previous blocks are found to be identical, provide from the storage 310 to the first host 302 a key transfer record including the keys to the data blocks encrypted with the public key of the first host 302.

According to an embodiment, the processor 320 is configured to compare the proof of ownership value to a proof of ownership value calculated by the second host, and determine that the new and previous blocks are identical if the proof of ownership values are identical. The proof of ownership (i.e. second hash value) of the new block of data calculated by the first host 302 is compared with the proof of ownership (i.e. second hash value) of previous block calculated by the second host.

Figure 4:
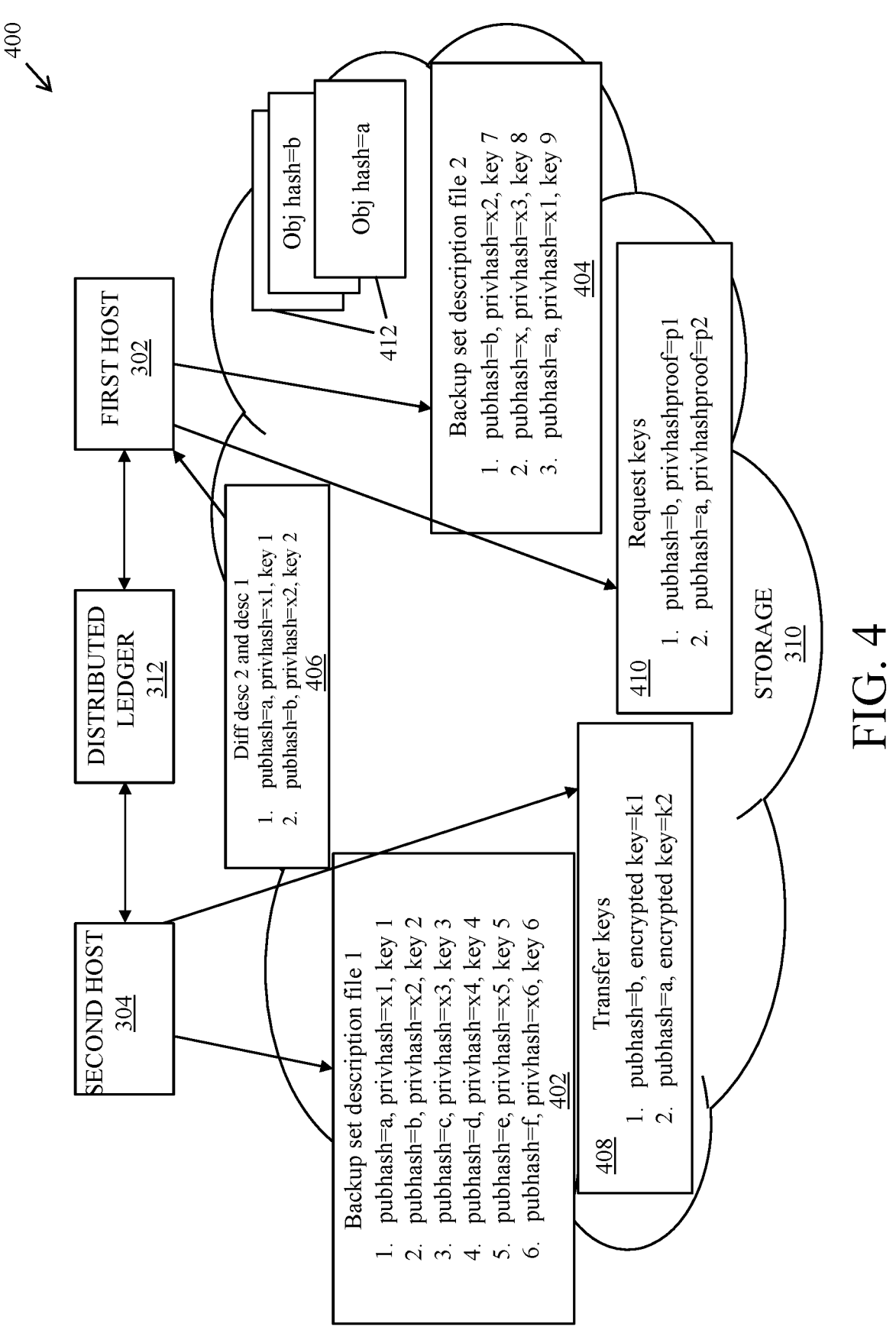
FIG. 4 is an illustration of an exemplary network environment diagram of a computer system of preventing duplication of encrypted data in a storage, in accordance with an embodiment of the present disclosure.

FIG. 4 is an illustration of an exemplary network environment diagram of a computer system of preventing duplication of encrypted data in a storage, in accordance with an embodiment of the present disclosure. With reference to FIG. 4, there is shown the computer system 300. The computer system 300 includes the first host 302, the second host 304, the storage 310 and the distributed ledger 312.

The second host 304 has backup set description record 402 with hashes a, b, c, d, e, f (i.e. first hash values which are public hash values). The first host 302 has backup set description record 404 with hashes a, b, x. There is further shown in the backup set description record 402 and the backup set description record 404, second hash values (i.e. private hash) and corresponding random key for each block of data (i.e. chunks). As shown, there is are identical hashes a, b shown as record 406 (a similarity algorithm finds that backup set description record 402 and backup set description record 404 are similar i.e. have some identical hashes). So the computer system 300 allows the first host 302 to upload only data (i.e. chunk or blocks of data) with hash x to the storage 310. Thus, the first host 302 requests 408 i.e. (ownership request) to the storage 310 and an indication goes to the distributed ledger 312 for the similar backup set description record 402 for ownership of hash a, b. The second host 304 verifies if the request is correct (i.e. genuine) and provides key transfer record 410. The storage 310 may store the hashes a, b, c, d, e, and so on as records 412.

Figures 5A, 5B, 5C:
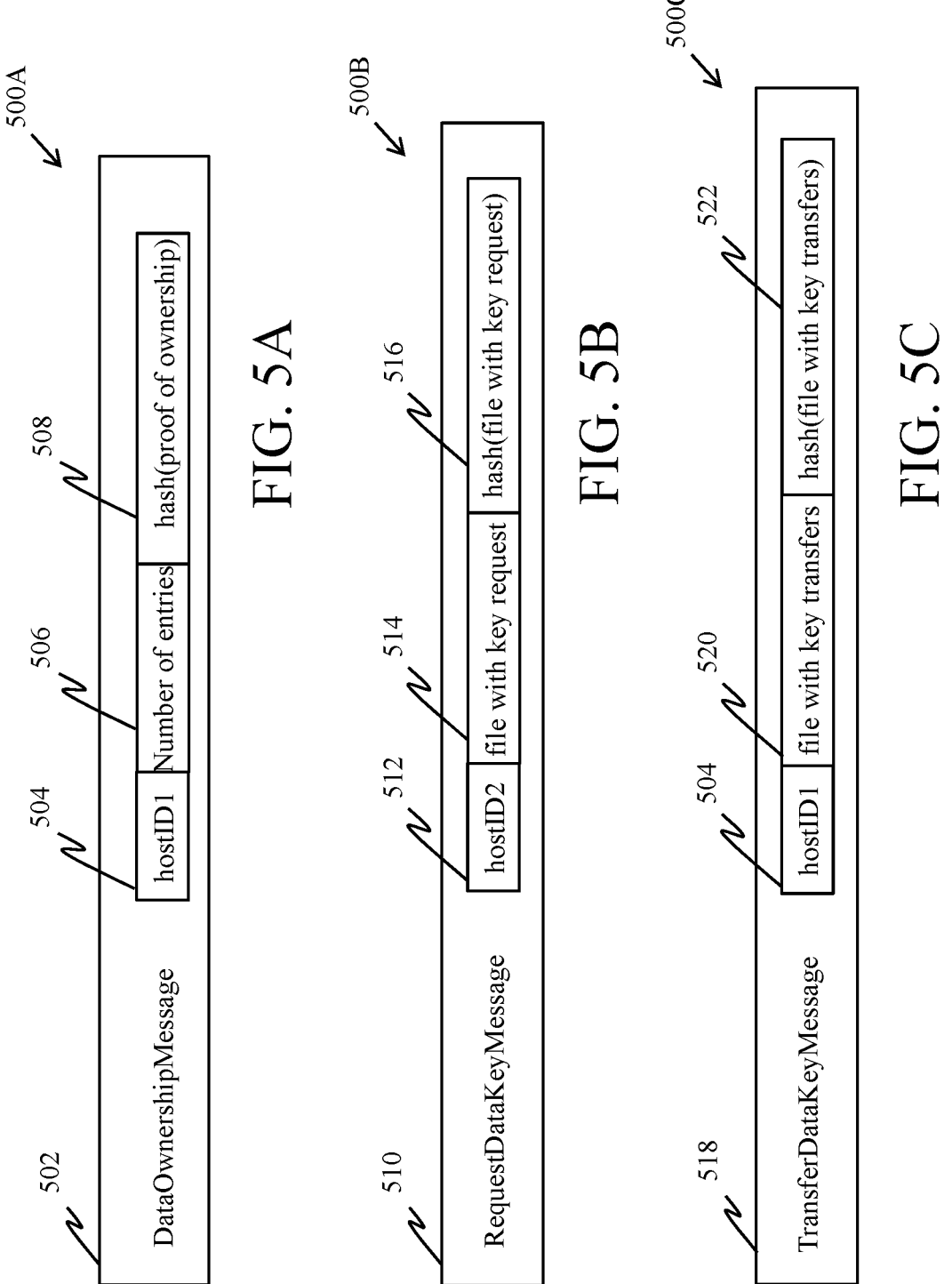
FIG. 5A is an illustration of an exemplary message used in a method of preventing duplication of encrypted data in the cloud storage, in accordance with an embodiment of the present disclosure.
FIG. 5B is an illustration of an exemplary message used in a method of preventing duplication of encrypted data in the cloud storage, in accordance with another embodiment of the present disclosure.
FIG. 5C is an illustration of an exemplary message used in a method of preventing duplication of encrypted data in the cloud storage, in accordance with yet another embodiment of the present disclosure.

FIG. 5A is an illustration of an exemplary message used in a method of preventing duplication of encrypted data in the cloud storage, in accordance with an embodiment of the present disclosure. With reference to FIG. 5A, there is shown the exemplary message 500A used in the method of preventing duplication of encrypted data in the cloud storage. The exemplary message 500A includes a data ownership message 502. The data ownership message 502 is an indication of the backup set description record.

The data ownership message 502 comprises an identity of a first host 504, a number of entries 506 in the backup set description record, a hash value of proof of ownership 508. The data ownership message 502 may also be referred to as ownership record.

FIG. 5B is an illustration of an exemplary message used in a method of preventing duplication of encrypted data in the cloud storage, in accordance with another embodiment of the present disclosure. With reference to FIG. 5B, there is shown the exemplary message 500B used in the method of preventing duplication of encrypted data in the cloud storage. The exemplary message 500B includes a request of ownership 510.

A request of ownership 510 comprises an identity of a second host 512, an identity of a file with key requests 514, and a hash value of the file with key request 516. The request of ownership 510 may also be referred to as the request data key message or key request message.

FIG. 5C is an illustration of an exemplary message used in a method of preventing duplication of encrypted data in the cloud storage, in accordance with yet another embodiment of the present disclosure. With reference to FIG. 5C, there is shown the exemplary message 500C used in the method of preventing duplication of encrypted data in the cloud storage. The exemplary message 500C includes a key transfer record 518. The key transfer record 518 comprises the identity of the first host 504, an identity of a file with key transfers 520 and a hash value of the file with key transfers 522. The key transfer record 518 may also be referred to as transfer data key message.

According to an embodiment, the exemplary messages 502, 510 and 518 are mere examples and any protocol may be used which enable the second host to prove that the new block of data is already present in the storage.

In an exemplary scenario, let's say host #1 (e.g. one of the first host 302 or the second host 304) may want to back-up a virtual machine. The host #1 (in this case, let's consider the first host 302) executes the following operations:

1. the host #1 may run variable length de-duplication; it chunks the data into variable length chunks;
2. for each chunk two hashes are created: (a) one hash which is a public hash and published later; (b) second hash (e.g. as a proof of ownership) that is a secret hash value, calculated for each chunk (i.e. each data block) using the specific host ID (i.e. ID of host #1) as well;
3. a random key is generated for each chunk data;
4. a backup set description file (i.e. backup set description record) is added to the cloud (such as storage 310). The file includes the list of chunks in the backups and for each chunk it includes 3 fields:
   a) the public hash of the data in the chunk,
   b) the secret hash of the data in the chunk (encrypted in a way so that just the host (such as the first host 302) can read it, and encrypt it with the random key from operation 3),
   c) the key for the chunk of data encrypted with a private key of the host (such as the first host 302), which uploaded the data. (so that the host, such as the first host 302) uploading the data can recover the key from the data in the cloud (such as the storage 310));
5. the host (such as the first host 302) uploads an indication (such as an indication file) in the ledger (such as the distributed ledger 312), where the indication states a fact that a backup description file is uploaded, and include the hash of the content of this file (i.e. the backup description file) in the message provided to the ledger (such as the distributed ledger 312), as well as how many hash digests are published (actually, the uploading in the ledger is done only after all the data is uploaded and the keys for existing data is transferred—the backup description file is also uploaded only after all the identical block found; In an example, this is done in a two phase operation: i) Upload the indication file; ii) find similar files and get the identical hashes; iii) request the key transfers; iv) upload all the data which is not existing; v) update the indication file, and then vi) finally, publish (upload) the file to the ledger; This is further understood in connection from operations below).
6. a process for checking which chunks already exist and obtaining right to access the chunk are described at operations 7, 8, 9, 10 listed below;

Cloud side operations (i.e. operations executed by the storage 310):

7. the cloud (such as storage 310) creates a search engine based on the backup set file. The search engine allows finding similar backup set files;
8. the cloud (such as storage 310) provides an API to get the backup description file which is most similar to the current backup file uploaded by the host #1 (such as the first host 302);
9. the host (such as first host 302) publishing a backup description file may ask the cloud (such as storage 310), to find the backup description file or files which shares the most public hash entries with a current file. The API is as following:

getMostSimilarBackupDescriptionFiles(backupDescip-
   tionFileID);
10. the cloud (such as storage 310) provides a set of the
   most similar backup file. i.e. files which share the most
   amount of identical public hashed with the backup-
   DesciptionFileID. The similar file can be found using
   similarity hash techniques such as minhash, i.e. for
   each backup description file a set of similarity hashes
   may be kept;
11. each chunk that was not found in the deduplication
   process of operation 6 is compressed and encrypted
   with the random key generated for the chunk at opera-
   tion 3;
12. the encrypted chunks is kept in the cloud (such as
   storage 310), as an object with KeyID which is equal to
   the public hush;
13. chunks that are already in the cloud (such as storage
   310) is not uploaded again. And thus, the deduplication
   is implemented. The indication file is updated in the
   ledger (such as the distributed ledger 312). Further, a
   backup set description file is uploaded in the storage
   310 which includes only blocks which do not have a
   matching hash value In another exemplary scenario, a distributed deduplication
is built based on the cloud API in untrusted environment.
The following operations are executed: A host (such as first
host 302) creating a new backup, uploads the backup
description file to the cloud (such as the storage 310), As in operation 6 of previous scenario, operation 6 is
elaborated on how it works:
   a. a host (such as first host 302) creating the backup set
      calls the cloud (such as storage 310) and asks to find the
      most similar backup sets, compared to the "backup set
      description file" it uploaded on operation 4 above;
   b. the host (such as first host 302) downloads each such
      backup set which a second host (such as a second host
      304) created (for simplicity assume a single backup set
      is downloaded);
   c. for each hash shared in the two files the host initiates
      a RequestDataKey process, the first host 302 uploads to
      the cloud (such as a storage 310) a file with all the
      entries of the requests, each entry includes:
      i. public hash value the data,
      ii. proof of ownership of the second Private hash, the
         data is the second private hash encrypted along with
         the id of the first host 302 requesting the data
         encrypted with the public key of the second host 304
         currently owning the data,
   d. the first host 302 publishes in the ledger (such as the
      distributed ledger 312) that a request of ownership file
      is published along with the hash value of the file
      content, and the number of hash requests;
   e. the second host 304 seeing the request on the ledger
      (such as the distributed ledger 312) reads the request
      file as well as the original hash backup file that it
      published, the second host 304 verifies that indeed all
      the request are genuine, and creates a file with the keys
      for each chunk encrypted with a random key, the file is
      uploaded to the cloud (such as storage 310);
   f. the second host 304 then publishes a data TransferDat-
      aKeyMessage message on the block chain (such as the
      distributed ledger 312) with the random key from
      operation "e", encrypted by the public key of the first
      host 302, where the keys are automatically written to
      the file.

Modifications to embodiments of the present disclosure
described in the foregoing are possible without departing from the scope of the present disclosure as defined by the
accompanying claims. Expressions such as "including",
"comprising", "incorporating", "have", "is" used to describe
and claim the present disclosure are intended to be construed
in a non-exclusive manner, namely allowing for items,
components or elements not explicitly described also to be
present. Reference to the singular is also to be construed to
relate to the plural. The word "exemplary" is used herein to
mean "serving as an example, instance or illustration". Any
embodiment described as "exemplary" is not necessarily to
be construed as preferred or advantageous over other
embodiments and/or to exclude the incorporation of features
from other embodiments. The word "optionally" is used
herein to mean "is provided in some embodiments and not
provided in other embodiments". It is appreciated that
certain features of the present disclosure, which are, for
clarity, described in the context of separate embodiments,
may also be provided in combination in a single embodi-
ment. Conversely, various features of the present disclosure,
which are, for brevity, described in the context of a single
embodiment, may also be provided separately or in any
suitable combination or as suitable in any other described
embodiment of the disclosure.

What is claimed is:
1. A method for preventing duplication of encrypted data
in a storage arranged in a network in which two or more
hosts can store data in the network, the method comprising:
   initiating, by a first host of the two or more hosts, storing
      of a plurality of new blocks of data in the storage;
   obtaining, by the first host, a first hash value for each
      block in the plurality of new blocks of data, wherein the
      storage comprises one or more encrypted data blocks,
      wherein the network comprises a distributed ledger
      accessible to each of the two or more hosts, and
      wherein the distributed ledger holds, for each of the one
      or more encrypted data blocks, a first hash value
      identifying the encrypted data block and one or more
      indications of ownership for the encrypted data block,
      wherein each of the one or more indications of own-
      ership includes a host identifier (ID) to indicate a host,
      among the two or more hosts, as an owner of the data
      block in the storage;
   obtaining, by the first host, a proof of ownership for each
      block in the plurality of new blocks of data, wherein a
      second hash value, generated based on the host ID and
      a new data block in the plurality of new blocks of data,
      is used as the proof of ownership for the new data
      block;
   obtaining, by the first host, a random key for each block
      in the plurality of new blocks of data;
   generating, by the first host, a backup set description
      record comprising a listing of each block in the plu-
      rality of new blocks of data, wherein the backup set
      description record indicates, for each block in the
      plurality of new blocks of data, the first hash, the proof
      of ownership, and the random key for the block;
   storing, by the first host, the backup set description record
      in the storage;
   storing, by the first host, an indication of the backup set
      description record in the distributed ledger;
   determining, by the first host, zero or more blocks in the
      plurality of new blocks of data that are present in the
      storage, and updating the indications of ownership for
      the zero or more blocks;
   generating, by the first host, an encrypted copy of each of
      the remaining blocks not included in the zero or more
      blocks based on the random key; and storing, by the first host, encrypted copies of the remaining blocks in the storage;

wherein determining the zero or more blocks in the plurality of new blocks of data that are present in the storage, and updating the indications of ownership for the zero or more blocks comprises:

querying the storage for one or more second backup set description records;

retrieving the one or more second backup set description records;

determining whether there is a first hash in any of the second backup set description records that matches a first hash in the backup set description record; and updating the indications of ownership for each block having a matching first hash to indicate the first host as an owner.

2. The method according to claim 1, further comprising obtaining the second hash value for each block in the plurality of new blocks of data as the proof of ownership.

3. The method according to claim 1, further comprising:

encrypting the proof of ownership for each block in the plurality of new blocks of data as an encrypted proof of ownership;

encrypting the random key for each block in the plurality of new blocks of data as an encrypted random key; and indicating the encrypted proof of ownership and the encrypted random key for each block in the plurality of new blocks of data in the backup set description record.

4. The method according to claim 1, wherein the querying the storage for the one or more second backup set description records comprises:

causing a similarity finding search to be performed by the storage.

5. The method according to claim 1, wherein updating the indications for each block having a matching first hash to indicate the first host as the owner comprises:

retrieving a public key of a current host owner from the indications of ownership;

generating the proof of ownership based on the public key of the current host owner; and storing a request of ownership in the distributed ledger, wherein data associated with the request of ownership includes all blocks having a matching first hash, wherein the first hash and the proof of ownership of each block having a matching first hash are stored in the storage.

6. The method according to claim 1, further comprising storing the indication of the backup set description record in the distributed ledger along with a hash for the backup set description record.

7. The method according to claim 1, wherein the distributed ledger is a blockchain.

8. The method according to claim 7, wherein the blockchain is a hyperledger.

9. A non-transitory computer-readable storage medium storing computer-readable code that, when run by one or more processors, causes a first host to implement a method for preventing duplication of encrypted data in a storage arranged in a network in which two or more hosts can store data, by performing the steps of:

initiating storing of a plurality of new blocks of data in the storage;

obtaining a first hash value for each block in the plurality of new blocks of data, wherein the storage comprises one or more encrypted data blocks, wherein the network comprises a distributed ledger accessible to each of the two or more hosts, and wherein the distributed ledger holds, for each of the one or more encrypted data blocks, a first hash value identifying the encrypted data block and one or more indications of ownership for the encrypted data block, wherein each of the one or more indications of ownership includes a host identifier (ID) to indicate a host, among the two or more hosts, as an owner of the data block in the storage;

obtaining a proof of ownership for each block in the plurality of new blocks of data;

obtaining a random key for each block in the plurality of new blocks of data, wherein a second hash value, generated based on the host ID and a new data block in the plurality of new blocks of data, is used as the proof of ownership for the new data block;

generating a backup set description record comprising a listing of each block in the plurality of new blocks of data, wherein the backup set description record indicates, for each block in the plurality of new blocks of data, the first hash, the proof of ownership, and the random key for the block;

storing the backup set description record in the storage;

storing an indication of the backup set description record in the distributed ledger;

determining zero or more blocks in the plurality of new blocks of data that are present in the storage, and updating the indications of ownership for the zero or more blocks;

generating an encrypted copy of each of the remaining blocks not included in the zero or more blocks based on the random key; and storing encrypted copies of the remaining blocks in the storage;

wherein determining the zero or more blocks in the plurality of new blocks of data that are present in the storage, and updating the indications of ownership for the zero or more blocks comprises:

querying the storage for one or more second backup set description records;

retrieving the one or more second backup set description records;

determining whether there is a first hash in any of the second backup set description records that matches a first hash in the backup set description record; and updating the indications of ownership for each block having a matching first hash to indicate the first host as an owner.

10. The computer-readable storage medium according to claim 9, the steps further comprising obtaining the second hash value for each block in the plurality of new blocks of data as the proof of ownership.

11. The computer-readable storage medium according to claim 9, the steps further comprising:

encrypting the proof of ownership for each block in the plurality of new blocks of data as an encrypted proof of ownership;

encrypting the random key for each block in the plurality of new blocks of data as an encrypted random key; and indicating the encrypted proof of ownership and the encrypted random key for each block in the plurality of new blocks of data in the backup set description record.

12. The computer-readable storage medium according to claim 9, wherein the querying the storage for the one or more second backup set description records comprises:

causing a similarity finding search to be performed by the storage.

13. The computer-readable storage medium according to claim 9, wherein updating the indications for each block having a matching first hash to indicate the first host as the owner comprises:

retrieving a public key of a current host owner from the indications of ownership;

generating the proof of ownership based on the public key of the current host owner; and storing a request of ownership in the distributed ledger, wherein data associated with the request of ownership includes all blocks having a matching first hash, wherein the first hash and the proof of ownership of each block having a matching first hash are stored in the storage.

14. The computer-readable storage medium according to claim 9, the steps further comprising storing the indication of the backup set description record in the distributed ledger along with a hash for the backup set description record.

15. A first host, comprising:

one or more processors; and a memory storing instruction that, when executed by the one or more processors, cause the first host to implement a method for preventing duplication of encrypted data in a storage arranged in a network in which two or more hosts can store data, by performing the steps of:

initiating storing of a plurality of new blocks of data in the storage;

obtaining a first hash value for each block in the plurality of new blocks of data, wherein the storage comprises one or more encrypted data blocks, wherein the network comprises a distributed ledger accessible to each of the two or more hosts, and wherein the distributed ledger holds, for each of the one or more encrypted data blocks, a first hash value identifying the encrypted data block and one or more indications of ownership for the encrypted data block, wherein each of the one or more indications of ownership includes a host identifier (ID) to indicate a host, among the two or more hosts, as an owner of the data block in the storage;

obtaining a proof of ownership for each block in the plurality of new blocks of data;

obtaining a random key for each block in the plurality of new blocks of data, wherein a second hash value, generated based on the host ID and a new data block in the plurality of new blocks of data, is used as the proof of ownership for the new data block;

generating a backup set description record comprising a listing of each block in the plurality of new blocks of data, wherein the backup set description record indicates, for each block in the plurality of new blocks of data, the first hash, the proof of ownership, and the random key for the block;

storing the backup set description record in the storage;

storing an indication of the backup set description record in the distributed ledger;

determining zero or more blocks in the plurality of new blocks of data that are present in the storage, and updating the indications of ownership for the zero or more blocks;

generating an encrypted copy of each of the remaining blocks not included in the zero or more blocks based on the random key; and storing encrypted copies of the remaining blocks in the storage;

wherein determining the zero or more blocks in the plurality of new blocks of data that are present in the storage, and updating the indications of ownership for the zero or more blocks comprises:

querying the storage for one or more second backup set description records;

retrieving the one or more second backup set description records;

determining whether there is a first hash in any of the second backup set description records that matches a first hash in the backup set description record; and updating the indications of ownership for each block having a matching first hash to indicate the first host as an owner.

16. The first host according to claim 15, the steps further comprising obtaining the second hash value for each block in the plurality of new blocks of data as the proof of ownership.

17. The first host according to claim 15, the steps further comprising:

encrypting the proof of ownership for each block in the plurality of new blocks of data as an encrypted proof of ownership;

encrypting the random key for each block in the plurality of new blocks of data as an encrypted random key; and indicating the encrypted proof of ownership and the encrypted random key for each block in the plurality of new blocks of data in the backup set description record.

18. The first host according to claim 15, wherein the querying the storage for the one or more second backup set description records comprises:

causing a similarity finding search to be performed by the storage.

19. The first host according to claim 15, wherein updating the indications for each block having a matching first hash to indicate the first host as the owner comprises:

retrieving a public key of a current host owner from the indications of ownership;

generating the proof of ownership based on the public key of the current host owner; and storing a request of ownership in the distributed ledger, wherein data associated with the request of ownership includes all blocks having a matching first hash, wherein the first hash and the proof of ownership of each block having a matching first hash are stored in the storage.

20. The first host according to claim 15, the steps further comprising storing the indication of the backup set description record in the distributed ledger along with a hash for the backup set description record.

* * * * *